United States Patent [19]

Hassler

[11] Patent Number: 4,895,621

[45] Date of Patent: Jan. 23, 1990

[54] WATER SOLUBLE THERMOSETTING RESIN, PROCESS FOR ITS PRODUCTION, PAPER SIZING COMPOSITION AND PAPER SIZING PROCESS

[75] Inventor: Thord G. Hassler, Helsingborg, Sweden

[73] Assignee: W. R. Grace AB, Helsingborg, Sweden

[21] Appl. No.: 932,117

[22] Filed: Nov. 18, 1986

[30] Foreign Application Priority Data

Nov. 18, 1985 [DE] Fed. Rep. of Germany ....... 3541511

[51] Int. Cl.$^4$ .............................................. D21H 3/36
[52] U.S. Cl. ............................. 162/164.3; 162/164.6; 162/168.2; 525/374; 525/377; 525/383; 525/385
[58] Field of Search ............... 162/168.2, 164.6, 164.3; 525/374, 377, 383, 385; 528/266, 268, 267

[56] References Cited

FOREIGN PATENT DOCUMENTS 131306 1/1985 European Pat. Off. .
142962 8/1985 European Pat. Off. .
3313726 10/1984 Fed. Rep. of Germany ... 162/168.2

OTHER PUBLICATIONS

Chem. Abst. 103 (16): 124086X, Veki et al.

Primary Examiner—Peter Chin
Attorney, Agent, or Firm—Steven T. Trinker

[57] ABSTRACT

A water soluble thermosetting resin useful as a promoter for paper sizing is described. Polyallylamine or a modified polyallyamine is reacted with epichlorohydrin and/or formaldehyde. The formaldehyde may be reacted with the polyallylamine in the presence of dicyandiamide, urea or an ammonium salt or mixtures thereof.

12 Claims, No Drawings

WATER SOLUBLE THERMOSETTING RESIN, PROCESS FOR ITS PRODUCTION, PAPER SIZING COMPOSITION AND PAPER SIZING PROCESS

The invention relates to a water soluble thermosetting resin and a process for its production which is useful as a promoter for paper sizing, particularly paper sizing with ketene dimers, and improves the stability of paper sizing compositions in the form of an emulsion. Further the present invention relates to paper sizing compositions comprising the novel water soluble thermosetting resin and paper sizing processes wherein said resin is used in combination with a reactive size.

Sizing agents are used in the manufacture of paper and board. Ketene dimers (alkyl ketene dimers) are presently preferred sizing agents (cf e.g. DE-AS 22 50 995) but also anhydride derivatives and alkylisocyanates can be used. However, already at an early stage it was realized that it is necessary to improve the sizing characteristics of sizing agents such as ketene dimers through the use of promoters or accelerators. Thus, numerous proposals have already been made for suitable promoters or accelerators for sizing agents. For example reference is made to U.S. Pat. Nos. 3,957,574, 4,240,935, 4,317,756, 4,279,794, 3,923,745 and 4,407,994, but it is not claimed that this list is complete.

Despite the many proposed sizing agent promoters, which have been in part very successful, there is still a great need for additonal improvement.

Sizing agents like those based on ketene dimers are generally used in the form of aqueous emulsions. Unfortunately these emulsions are not very stable and therefore only limited amounts of reactive size can be included in these emulsions, e.g. paper sizing emulsions on the basis of alkyl ketene dimers usually contain 6 to 10 weight% alkyl ketene dimers. The low reactive size content of the conventional emulsions causes high transportation costs since great amounts of water have to be transported when shipping the paper sizing emulsions to the customers. Accordingly it would be highly desireable to increase the stability of the paper sizing emulsions and also the reactive size contents of these emulsions.

Accordingly, it is an object of the present invention to provide a substance useful as promoter for paper sizing, particularly paper sizing with ketene dimers, which permits a more rapid sizing or hardening and also a better utilization of the sizing agent.

Another object of the present invention is to provide a substance useful as stabilizer for sizing agent emulsions, which improves the stability of sizing agent emulsions and in addition allows higher reactive size contents in the sizing agent emulsions.

These and further objects will become apparent as the description of the invention proceeds.

The present invention is directed to a water soluble thermosetting resin comprising the reaction product of polyallylamine and epihalohydrin and/or formaldehyde.

Further the present invention is directed to a process for producing this resin, paper sizing compositions comprising a reactive size in combination with this resin and paper sizing processes in which this resin is used in combination with a reactive size.

Polyallylamine is a difficultly produceable polymer obtainable by the polymerization of allylamine or allylamine salts. Reference is made in this connection to European patent application No. 95233 and to the corresponding U.S. Pat. No. 4,504,640, which describe the preferred procedure for producing polyallylamine and give a comprehensive survey of other, less preferred production processes. According to the invention, preferably polyallylamine with a number average molecular weight (g/mol) of 5000 to 100.000, usually 10.000 to 100.000 and mostly 10.000 to 50.000 is used.

According to a first embodiment of the present invention polyallylamine is reacted in an aqueous and preferably approximately 10 to 30% solution with epihalohydrin. The epihalohydrin, preferably epichlorohydrin is added in a quantity of 0.1 to 3 mol and preferably 0.5 to 1.5 mol per mol of amine nitrogen in the polyallylamine. The epihalohydrin slowly dissolves in the reaction solution, accompanied by a reaction with the polyallylamine until finally a clear solution is obtained. In order to advance the reaction from this stage, it is necessary to set the pH-value at 6 or higher and the reaction solution must also be heated to obtain a reasonable reaction rate. Appropriately a temperature of 50 to 80° C. is chosen. Under these conditions, which can be set at the start of the reaction, the reaction progresses and is allowed to continue until the viscosity has risen to approximately 200 mPa s (centipoise) (measured at ambient temperature). If necessary, lye is intermediately added, in order to raise the pH-value, which has dropped, back to 6 or higher. Obviously the viscosity, up to which the reaction is allowed to continue, is greatly dependent on the starting concentration of the polyallylamine. The given value of 200 mPa s consequently applies to the preferred polyallylamine solutions with a concentration of approximately 20%. It is obvious to the expert that with other polyallylamine starting concentrations, the reaction is broken off on reaching a different viscosity value. Furthermore, the viscosity value given is not critical and instead constitutes a viscosity ensuring a good handling of the reaction product solution.

The reaction between the polyallylamine and the epihalohydrin is broken off in the conventional way by adding acid and cooling to ambient temperature. Preferably hydrochloric acid is used for this purpose.

Whilst the epihalohydrin is attached to the polyallylamine in the first process stage, reaction at elevated pH-value and temperature leads to a crosslinking reaction. Without wishing to establish a theory, it is assumed that in simplified diagramatic form roughly the following reaction takes place:

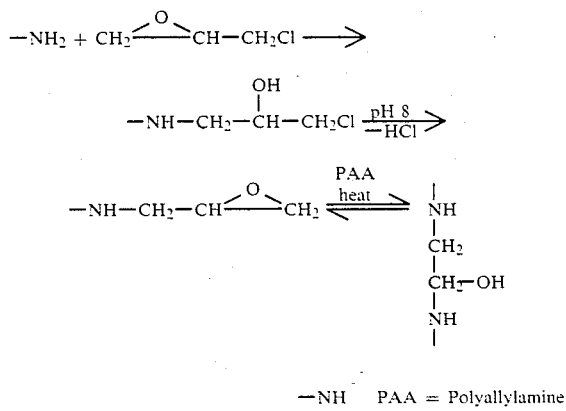

—NH    PAA = Polyallylamine

According to another embodiment of the present invention polyallylamine is reacted at acidic pH with formaldehyde, optionally in the presence of dicyandiamide and/or urea and/or an ammonium salt. The reaction may be brought about by reacting a solution of polyallylamine, formaldehyde and, if desired, dicyandiamide and/or urea and/or an ammonium salt at a temperature of 60° C. to 100° C. (reflux temperature) until the viscosity remains unchanged which usually takes about 1 to 4 hours. Formaldehyde is always used in a sufficient amount to form a reaction product having a minimum viscosity of 15 mPa s at 50% total solids without the formation of a gel. This useful amount of formaldehyde can be easily determined by those skilled in the art. The formaldehyde may also be added in two or more portions.

In case the reaction between polyallylamine and formaldehyde is carried out in the presence of dicyandiamide, the ratio of dicyandiamide (mols) to polyallylamine (amine equivalents) may be from 0.2:1.0 to 1.5:1.0, but preferably is 0.6:1.0 to 1.2:1. When using dicyandiamide it is advantageous to use the polyallylamine in the form of a polyallylamine hydrochloride salt. This will ensure that the pH is sufficiently acidic during the condensation as dicyandiamide will hydrolyse to basic compounds which increase the pH. Typically a formaldehyde condensation reaction solution with a dicyandiamide (mols) to polyallylamine (amine equivalents) ratio of 1.0:1.0 has in the initial stage of the reaction a pH of approximately 2, but the pH increases during reaction to a final pH of 4 to 5.

If so desired, a part of the amine functionality of the polyallylamine can be replaced by another ammonium salt. Useful salts are those having the formula $(NH_4)_nX$, $(RNH_3)_nX$ or $(R_2NH_2)_nX$ in which R is an alkyl radical having from 1 to 4 carbon atoms and X is an acid anion such as for example $Cl^-$ and $SO_4^{2-}$. When X is $SO_4^{2-}$ then n is 2 and when X is $Cl^-$ then n is 1. An example of a suitable ammonium salt is ammonium chloride. Further examples for suitable ammonium salts are the salts of ethylene diamine, diethylene triamine, tetraethylene pentamine, (3-aminopropyl) amine, tris(2-aminoethyl)amine and similar polyamines. Up to 50% of polyallylamine equivalents can be replaced by the ammonium salt.

Urea can also be incorporated in the resin, if so desired. A useful ratio of urea (mols) to amine (equivalents) ranges from 0.1:1 to 1:1. Urea may be added at any stage of the reaction.

It is also possible to combine the two above-described embodiments of the present invention. Thus it is feasible to first prepare a precondensate of polyallylamine resin as described above and then react this precondensate with epihalohydrin at a pH above 8 and at elevated temperature to produce the final resin. The reaction is terminated by lowering the pH to below 5 and cooling the reaction mixture when a viscosity of minimum 15 mPa s but preferably above 200 mPa s (20% total solids) has been reached. Of course, it is also possible to prepare a precondensate of polyallylamine resin by reacting polyallylamine with epihalohydrin first as disclosed above and then react the so obtained precondensate at acidic pH with formaldehyde as also described above.

In a further embodiment of the invention, the inventive resin comprises the reaction product of modified polyallylamine and epihalohydrin and/or formaldehyde. The modification of the polyallamine takes place by reacting with cyanamide or dicyandiamide in the melt. For this purpose, polyallylamine (based on the amine nitrogen contained therein) and cyanamide are mixed in a molar ratio of 1:2 or polyallylamine and dicyandiamide are mixed in a molar ratio of 1:1 and heated to approximately 130° C.. Without there being as yet complete clarity regarding the reaction sequence, as a result of the evolution of ammonia observed, it is assumed that it is a condensation reaction, which can be reproduced for dicyandiamide with the following reaction diagram:

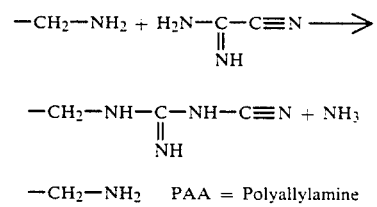

—CH$_2$—NH$_2$    PAA = Polyallylamine

The reaction between polyallylamine and cyanamide or dicyanamide takes place exothermically. Thus, the temperature rises during the reaction of its own accord to approximately 160° C.. This temperature is maintained until no further evolution of ammonia is observed. This is followed by cooling to approximately 140° C., so that a very viscous melt is obtained. Water is then rapidly added to this melt, in order to dissolve the reaction product and bring about a cooling to below 100° C.. In a less preferred process variant, the melt can be solidified by cooling and the solid obtained can be dissolved, optionally following mechanical comminution. However, this is more difficult than when adopting the first procedure. The modified polyallylamine obtained is reacted with epihalohydrin and/or formaldehyde in the aforementioned manner. When using epihalohydrin, 0.3 to 2.0 mol are used per mol of amine nitrogen in the modified polyallylamine. Here again the reaction is allowed to continue until a 20 to 25% solution has a viscosity of approximately 200 mPa s.

The resin according to the invention is used in paper-sizing together with conventional sizing agents. Sizes which can advantageously be combined with resins of the present invention are hydrophobic cellulose reactive sizing agents such as ketene dimers, anhydrides and isocyanates. Suitable ketene dimers are those prepared from carboxylic acids having 8 to 30 carbon atoms. Particularly useful are those prepared from carboxylic acids having alkyl substituents but also acids with aromatic substituents can be used. Examples of such acids are oleic acid, palmitic acid, stearic acid and behenic acid as well as naturally occurring mixtures such as those found in beef tallow and olive oil. Suitable anhydrides are (1) rosin anhydrides (U.S. Pat. No. 3 582 464), (2) anhydrides from fatty acids having a chain length of 8 to 24 carbon atoms and (3) cyclic dicarboxylic acid anhydrides such as alkenyl succinic anhydride. Useful isocyanates are rosin isocyanates (U.S. Pat. No. 3,582,464) and isocyanates having an alkyl substituent with 8 to 24 carbon atoms.

The preferred sizes are generally used in the form of an aqueous emulsion. Cationic starch, polyamidoamines and other prior art compounds are e.g. used as emulsifiers for the ketene dimer. The resin according to the invention can itself function as an emulsifier, so that optionally there is no need for conventional emulsifiers. The quantity ratio of the inventive resin to the size (ketene dimer and/or alkyl succnic anhydride) is generally 1:10 to 10:1 and is preferably 1:4 to 1:1. Obviously, the aqueous emulsions containing the inventive resin and cellulose reactive size (such as ketene dimer) can also contain other conventional additives, even if no significance is attached thereto from the standpoint of the invention.

As tests carried out with the resins according to the invention have revealed, their use leads to a surprisingly large increase of the sizing development during paper manufacture. Thus the resins of the present invention are excellent promoters for paper sizing. In addition, the addition of the resin according to the invention leads to an improved retention of the sizing agent, so that the latter (ketene dimer) i better utilized and smaller quantities thereof can be used for obtaining the same degree of sizing. Comparison tests with prior art promoters have further revealed that the resins according to the invention frequently lead to much stronger sizing, i.e. the final paper exhibits an improved water resistance. Finally it has been found that paper sizing compositions in the form of aqueous emulsions comprising a reactive size (ketene dimer etc.) and the resin according to the invention show a substantially improved stability which results in better storage properties or can be utilized to increase the reactive size content of the emulsion from usually 6 to 10% by weight to at least 15% by weight or more. It is obvious that such increase in the reactive size content drastically lowers transportation costs since much less water has to be transported to the customer.

The following examples are given for illustrative purposes only and are not meant to be a limitation on the subject invention. In all cases, unless otherwise noted, all parts and percentages are by weight.

EXAMPLE 1

50 g of 50% polyallylamine solution (PAA-HCL-3L from Nitto Boseki Co.) was diluted with 150 g of water and poured into a four necked round bottom flask equipped with heating mantle, agitator, contact thermometer and reflux condensor. 15.3 g of epichlorohydrin were dropwise added to the solution over 15 minutes. The temperature was kept at 25° C. during this time. The mixture was then heated to 60° C. and increased further to 80° C. because of the exothermal reaction. The temperature of 80° C. was maintained for two hours. The reaction mixture was then cooled to room temperature and subsequently acidified with hydrochloric acid to pH 4.5. The resin solution so obtained had a solids content of 14.4% and a Brookfield viscosity of 40 mPa s (Brookfield Model LVF Viscosimeter, No. 1 Spindle at 60 RPM).

EXAMPLE 2

To 200 g of the diluted polyallylamine solution used in Example 1 30.6 g of epichlorohydrin were added during 15 minutes using the same equipment as in Example 1. Again the reaction mixture was heated to 60° C. and the temperature then rose to 80° C. because of the exothermal reaction. Said temperature of 80° C. was maintained for 45 minutes, after which the reaction was terminated by cooling and subsequent acidification with hydrochloric acid to pH 4.5. The obtained resin solution was a clear liquid having a solids content of 10.8% and a Brookfield viscosity of 130 mPa s (Brookfield Model LVF, Spindle No. 2 at 60 RPM).

EXAMPLE 3

200 g of the diluted polyallylamine solution used in Example 1 was reacted with 38.3 g of epichlorohydrin at 80° C. for 30 minutes after which the reaction was terminated as described in Example 1. The obtained resin solution had a solids content of 17.6% and a Brookfield viscosity of 660 mPa s (Brookfield Model LVF Viscometer, No. 3 Spindle at 60 RPM).

EXAMPLE 4

38 g of the undiluted polyallylamine solution used in Example 1 were diluted with 150 g of water and transferred to the reaction equipment used in example 1. To the solution were added 6.32 g of urea, 5.64 g of ammonium chloride, 35.4 g of dicyandiamide and 54.96 g of formaldehyde (34.5% solution). This mixture was allowed to reflux for one hour and then diluted to 12.2% solids content and cooled to room temperature. The reaction product was a clear liquid. The viscosity of the aqeuous resin solution was 15.5 mPa s (Brookfield Model LVF Viscosimeter, No. 2 Spindle, 60 RPM).

EXAMPLE 5

An emulsion of alkyl ketene dimer, prepared from a mixture of palmitic and stearic acid, was prepared in the following manner:

50 parts of cationic corn starch were added to 742 parts of water. The slurry was heated to 90° C. and this temperature was maintained for 30 minutes to cook the starch. 8.0 parts of sodium lignin sulfonate and 200 parts of alkyl ketene dimer were then added under stirring to prepare a premix which was then passed through a piston-type homogenizer at a pressure of 200 bar. The homogenized premix was diluted with water to an alkyl ketene dimer content of 5%.

EXAMPLE 6

A portion of the emulsion of Example 5 was diluted with water to a ketene dimer solids content of 0.16%.

EXAMPLE 7

Products prepared in accordance with Example 1 and Example 5 were combined under further addition of water to provide an aqueous sizing composition containing 0.13% ketene dimer and 0.17% resin.

EXAMPLE 8

Products prepared in accordance with Example 2 and Example 5 were combined under addition of water to provide an aqueous sizing composition containing 0.13% ketene dimer and 0.17% resin.

EXAMPLE 9

Products prepared in accordance with Example 3 and Example 5 were combined under further addition of water to provide an aqueous sizing composition comprising 0.13% ketene dimer and 0.17% resin.

EXAMPLE 10

Products prepared in accordance with Example 4 and Example 5 were combined under further addition of water to provide an aqueous sizing composition containing 0.13% ketene dimer and 0.17% resin.

EXAMPLE 11

The aqueous dispersions prepared in Examples 6, 7, 8, 9 and 10 were applied as sizes to 65 g/m$^2$ laboratory made unsized hand sheets from bleached hardwood pulp in the following way:

The size dispersions of Examples 6 to 10 were diluted ten times with water and the pH was adjusted to 8.0. A sheet of paper was immersed in the dispersion and subsequently pressed between blotting paper to a wet pick up of 70%. Thereafter, the sheet was oven dried at 90° C. over a specific period of time (curing time). The degree of sizing was then immediately determined using the $Cobb_{60}$ test (SCAN/P 12:64). This procedure gave the results summarized in Table 1.

TABLE 1

| Example | Sizing degree ($Cobb_{60}$) Curing time | | |
|---|---|---|---|
| | 50 sec. | 130 sec. | 160 sec. |
| 6 | >100 | >100 | 23 |
| 7 | 24 | 22 | 20 |
| 8 | >100 | 24 | 22 |
| 9 | >100 | 26 | 21 |
| 10 | >100 | 28 | 23 |

EXAMPLE 12

Products prepared in accordance with Example 1 and Example 5 were combined under further addition of water to provide an aqueous sizing composition containing 0.16% ketene dimer and 0.2% resin.

EXAMPLE 13

Sizing efficiency was evaluated for the products prepared in Example 6 and Example 12 in the following way:

A furnish of bleached sulfate pulp of birch was prepared at 0.35% consistency. The pH was adjusted to 8 and the diluted sizing emulsion was added to the pulp furnish to give a ketene dimer amount of 1.0 kg ketene dimer per ton fiber. A sheet of paper was formed from the stock having a basis weight of 65 g/m². The sheet was pressed between blotting papers at a pressure of 5 bar for 5 minutes and subsequently cured at 90° C. for a predetermined period of time (curing time). The results are summarized in Table 2.

TABLE 2

| Example | Degree of sizing ($Cobb_{60}$) Curing time 90° C. (sec) | | | | | | | |
|---|---|---|---|---|---|---|---|---|
| | 105 | 120 | 135 | 150 | 165 | 180 | 195 | 220 |
| 6 | — | — | — | — | >100 | — | 41 | 22 |
| 12 | 76 | 28 | 22 | 19 | | | | |

EXAMPLE 14

An emulsion of an alkyl ketene dimer, prepared from a mixture of palmitic and stearic acids, was prepared in the following manner: 56 parts of cationic corn starch were added to 798 parts of water. The slurry was heated to 90° C. and this temperature was maintained for 30 minutes to cook the starch. 11 parts of sodium lignin sulfonate and 375 parts of alkyl ketene dimer were added to the starch solution under stirring. The mixture was passed through a piston-type homogenizer and the homogenized mixture was cooled to room temperature and diluted with water to give a ketene dimer concentration of 15%.

EXAMPLE 15

To 100 parts of an emulsion prepared according to Example 14 6.0 parts of the resin solution of Example 1 were added. The mixture was stirred for 20 sec. at high speed.

EXAMPLE 16

The size emulsions prepared in Examples 14 and 15 were subjected to a 20 day shelf-life test with frequent control of physical stability by visual microscopial examination after dilution with water. The results of this test are summarized in Table 3.

TABLE 3

| Example | Aggregate formation after days of storage | | | | |
|---|---|---|---|---|---|
| | 0 | 1 | 2 | 4 | 20 |
| 14 | no aggregates formed | some aggregates formed | strongly aggregated | strongly aggregated sample separated | strongly aggregated sample sep. |
| 15 | no aggregates formed | no aggregates formed | few small aggregates | few small aggregates | few small aggregates |

What we claim is:

1. A water soluble thermosetting resin comprising the reaction product of polyallylamine and (i) from about 0.1 to about 3 moles of epihalohydrin per mole of amine nitrogen in said polyallylamine, or (ii) formaldehyde in an amount sufficient to produce a reaction product having a viscosity of at least 15 mPas.; or (iii) mixtures of (i) and (ii).

2. Resin according to claim 1, wherein the reaction is between polyallylamine and formaldehyde and is carried out in the presence of dicyandiamide, urea, an ammonium salt or mixtures thereof.

3. Resin according to claim 1, wherein the polyallylamine is first modified by reaction with cyanamide or dicyandiamide.

4. Resin according to claim 1, wherein the starting polyallylamine has a molecular weight of 5000 to 100,000.

5. Resin according to claim 1, wherein the epihalohydrin is epichlorohydrin.

6. A process for producing a water soluble thermosetting resin comprising reacting polyallylamine in aqueous solution with
   (a) from about 0.1 to about 3 moles of epihalohydrin per mole of amine nitrogen in said polyallylamine at elevated temperature in the range of 50 to 80° C. and at a pH of 8 or higher until a viscosity of at least 15 mPas is attained,
   (b) formaldehyde in an amount sufficient to produce a reaction product having a viscosity of at least 15 mPas at elevated temperature in the range of 60° C. to reflux temperature and at an acidic pH in the range of 2 to 6.

7. Process according to claim 6, wherein the reaction is between polyallylamine and formaldehyde and is carried out in the presence of dicyandiamide, urea, an ammonium salt or mixtures thereof.

8. Process according to claim 6, wherein the polyallylamine is first modified by reaction in the melt with cyanamide or dicyandiamide.

9. Process according to claim 8, wherein the polyallylamine modification reaction is at approximately 100° C. with approximately 2 mol of cyanamide or approximately 1 mol of dicyandiamide per mol of amine nitrogen.

10. Process according to claim 6, wherein the polyallylamine is reacted with 0.1 to 3 mol of epihalohydrin per mol of amine nitrogen in the polyallylamine.

11. Process according to claim 8, wherein the modified polyallylamine is reacted with 0.3 to 2.0 mol of epihalohydrin per mol of amine nitrogen in the modified polyallylamine.

12. Process according to claim 7, wherein 0.6 to 1.2 equivalents of dicyandiamide are used per amine equivalent of polyallylamine.

* * * * *